(12) United States Patent
Reed et al.

(10) Patent No.: US 8,776,257 B2
(45) Date of Patent: *Jul. 8, 2014

(54) SESSION-CONTROLLED-ACCESS OF CLIENT DATA BY SUPPORT PERSONNEL

(75) Inventors: David Charles Reed, Tucson, AZ (US); Jeffrey Thomas Sheridan, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,694

(22) Filed: Apr. 23, 2012

(65) Prior Publication Data

US 2012/0210446 A1   Aug. 16, 2012

Related U.S. Application Data

(63) Continuation of application No. 12/843,013, filed on Jul. 24, 2010.

(51) Int. Cl.
*H04L 29/06* (2006.01)
(52) U.S. Cl.
USPC .......................................................... 726/27
(58) Field of Classification Search
None
See application file for complete search history.

(56) References Cited

U.S. PATENT DOCUMENTS

| 5,790,650 | A * | 8/1998 | Dunn et al. ............. 379/265.03 |
| 6,088,679 | A * | 7/2000 | Barkley .................... 705/7.26 |
| 6,246,752 | B1 * | 6/2001 | Bscheider et al. ......... 379/88.22 |
| 7,050,996 | B1 | 5/2006 | Blagg et al. |
| 7,200,747 | B2 | 4/2007 | Riedel et al. |
| 7,228,145 | B2 * | 6/2007 | Burritt et al. ................ 455/519 |
| 7,380,271 | B2 | 5/2008 | Moran et al. |
| 7,509,491 | B1 | 3/2009 | Wainner et al. |
| 7,512,971 | B2 | 3/2009 | Ellington |
| 7,650,644 | B2 * | 1/2010 | Cheng et al. ................... 726/27 |
| 2003/0055757 | A1 * | 3/2003 | Pfiffner et al. ................. 705/35 |
| 2003/0120571 | A1 | 6/2003 | Blagg |
| 2004/0030657 | A1 | 2/2004 | Holm-Blagg et al. |
| 2007/0055628 | A1 | 3/2007 | Blagg et al. |
| 2007/0162320 | A1 | 7/2007 | Joshi et al. |
| 2008/0016560 | A1 | 1/2008 | Papillon et al. |

OTHER PUBLICATIONS

Johnston, et al., "Authorization and Attribute Certificates for Widely Distributed Access Control," Lawrence Berkeley National Laboratory, Jun. 28, 1998.

* cited by examiner

*Primary Examiner* — David Pearson
(74) *Attorney, Agent, or Firm* — Nelson and Nelson; Daniel P. Nelson; Alexis V. Nelson

(57) ABSTRACT

A method for controlling access to client data by support providers is disclosed herein. In one embodiment, such a method includes initiating a session on a server computer in response to receipt of a request for assistance from a client, the session having client data associated therewith. A session key is generated for the session. The session key includes a session identifier and a support provider identifier corresponding to an assignee. The session key may further include a client identifier corresponding to the client. Requests to access the client data include an assignee key including a session identifier and a support provider identifier, and potentially a client identifier if needed. The assignee key is compared to the session key. If correspondence is found between the identifiers in the assignee key and the session key, access is granted.

8 Claims, 7 Drawing Sheets

SESSION-CONTROLLED-ACCESS OF CLIENT DATA BY SUPPORT PERSONNEL

BACKGROUND

1. Field of the Invention

This invention relates to apparatus and methods for controlling access of client data by personnel providing technical support or other assistance.

2. Background of the Invention

Computers are involved in many aspects of individual's and businesses' activities. The data stored on a computer or in a database used by an individual or business may therefore contain sensitive information that would cause embarrassment or economic harm if disclosed. Public disclosure of data that an individual or business has an obligation to keep private may result in liability. Disclosure of personal and business information may enable identity thieves to pose as an individual or business and incur liabilities or commit crimes.

Notwithstanding the sensitive nature of information stored on a computer, access by others may be required in order to diagnose and/or address problems or concerns. For example, in the computer hardware and software industry, access by technical support personnel may be required to diagnose and fix problems with a customer's computer hardware or software. Disclosure of information may also be required in order for a user to obtain assistance in using computer hardware or software. Similarly, in the credit card industry, access by a customer support representative may be required to diagnose and address problems with billing or unauthorized charges to a credit card. Similar examples where access by others is required are readily found in many other industries.

Many companies operate large call centers or technical support groups that are responsible for assisting users of the company's products. The large number of employees at these facilities means a large number of people can potentially access customer information that is required to assist the customer or made accessible during the process of assisting the customer. This makes tracking the source of data breaches difficult and increases the risk that customer data will be inadvertently or maliciously made public.

In view of the foregoing, it would be an advance in the art to provide an apparatus and method that could restrict access to customer information while still allowing support personnel to provide technical support and other types of assistance.

SUMMARY

The invention has been developed in response to the present state of the art and, in particular, in response to the problems and needs in the art that have not yet been fully solved by currently available apparatus and methods. Accordingly, the invention has been developed to provide apparatus and methods for controlling access to client data by support personnel. The features and advantages of the invention will become more fully apparent from the following description and appended claims, or may be learned by practice of the invention as set forth hereinafter.

Consistent with the foregoing, a method for controlling access to client data by support providers is disclosed herein. In one embodiment, such a method includes initiating a session on a server computer in response to receipt of a request for assistance from a client, the session having client data associated therewith. A session key is generated for the session. The session key includes a session identifier and a support provider identifier corresponding to an assignee. The session key may further include a client identifier corresponding to the client. Requests to access the client data include an assignee key including a session identifier and a support provider identifier. The assignee key is compared to the session key. If correspondence is found between the session identifiers and support provider identifiers of the assignee key and the session key, access is granted. In embodiments where the session key and assignee key include client identifiers, access is granted if the client identifiers of the session key and assignee key also match.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
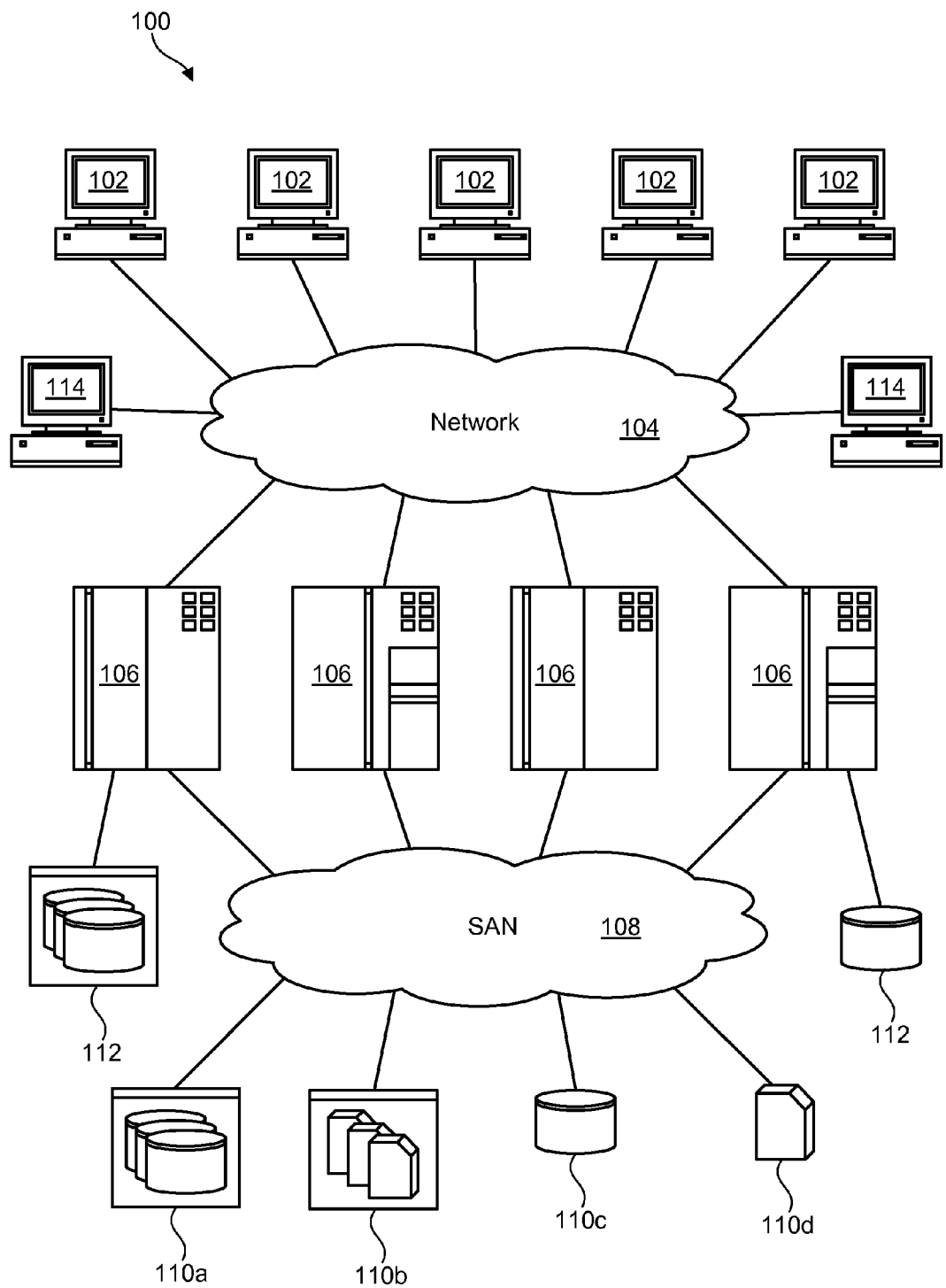
FIG. 1 is a high-level block diagram showing one example of a network environment where an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the illustrated network architecture 100 and components thereof.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the client computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a server 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

In selected embodiments, a plurality of support computers 114, operated by support personnel, may be operably connected to the servers 106, such as by means of the network 104. The support computers 114 may communicate with the client computers 102 by means of the servers 106 and network 104. Alternatively, an independent communication channel between the support computers 114 and client computers 102 may exist. In yet another alternative embodiment, servers 106 include displays and input devices enabling direct interaction by support personnel therewith.

Figure 2:
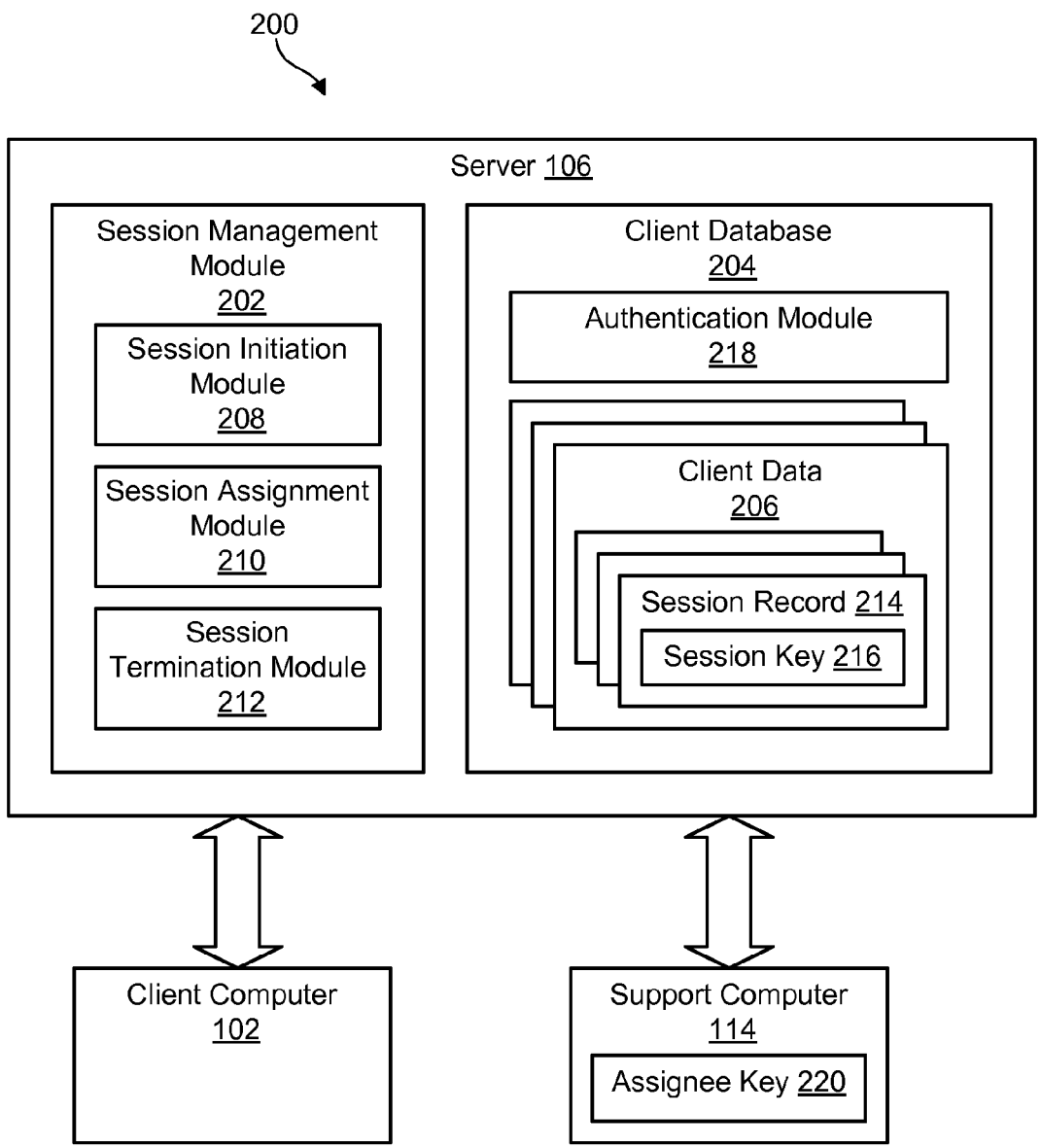
FIG. 2 is a high-level block diagram of one embodiment of a system for controlling access to client data by support personnel.

Referring to FIG. 2, a system 200 for controlling access to client data by support personnel may include one or more servers 106 hosting a session management module 202 and a client database 204. Each of the session management module 202 and client database 204 may be hosted on one or more servers. Accordingly, the functionality described below for the session management module 202 and client database 204 may be performed by any combination of one or more servers 106. Hereinafter reference to a server 106 also shall also be considered to refer to multiple servers 106 performing the functionality ascribed to the server 106.

As shown, the server 106 communicates with one or more client devices, such as a client computer 102. The client device may also be embodied as a telephone, web-enabled cell phone, or other personal electronic device capable of data communication with another computer. The server 106 may also be in data communication with one or more support computers 114 operated by support providers providing assistance to clients, such as those operating the client computers 102. Alternatively, a support provider may interact directly with the server 106.

The client database 204 may be operable to store client data 206. Embodiments of the present invention find particular application where the client data 206 is sensitive and or private such as health records, financial information, trade secrets, privileged information, and the like. The client data 206 may also include data that would enable the commission of identity theft such as the name, social security number, credit card number, and other personal information of an individual.

The session management module 202 may be operable to control access to the client data 206 by those providing technical support or other assistance to an owner of the client data 206. For example, the session management module 202 and client database 204 may be hosted by a computer hardware or software provider or by a company providing technical support on behalf of such a company. The session management module 202 and client database 204 may also be used by those providing support to an owner of the client data 206 in relation to the provision of a service relating to a credit card, bank account, investment portfolio, or the like.

The session management module 202 may include a session initiation module 208, session assignment module 210, and session termination module 212. The session initiation module 208 may receive requests for assistance from clients. The session initiation module 208 initiates a session in response to the request for assistance. The client sending the request may have information stored in the client database 204 or information of the client may be stored in the client database 204 subsequent to receipt of the request by the host system 106. The session initiation module 208 may create a session record 214 to record the existence of the session and store other data relating to the session. The session initiation module 208 may store the session record 214 in the client database 204 as part of the data 206 of the client whose request initiated the session. Alternatively, or in addition, the session initiation module 208 may store the session record 214 in some other volatile or non-volatile memory operably coupled to the server 106.

The session initiation module 208 may invoke the session assignment module 210 to associate the session with a specific support provider. The support provider may be a person or organization responsible for responding to the client's request for assistance. The session assignment module 210 may associate the session with a specific support provider by generating a session key 216. The session key 216 may either be stored as part of the session record 214 or associated with the session record 214 by some other means, such as a lookup table, hash table, or some other data structure. Assignment by the assignment module 210 may include setting a support provider identifier field of the session key 216 equal to an identifier of an assignee support provider. The identifier may be associated with an individual or a group of individuals. For example, the support provider identifier of the session key 216 may be a group identifier where the group is defined by an access list including identifiers of individuals who belong to that group.

The session key 216 may also include a client identifier corresponding to the client whose request for assistance initiated creation of the session record 214. The client identifier, for example, may include an account number of the client. The session key 216 may further include a session identifier generated by the session initiation module 208 upon creation of the session record. The session identifier may be a randomly or programmatically generated number that uniquely identifies the session from other sessions or from other active sessions that have not been terminated. In some embodiments, the session identifier uniquely identifies the session only in combination with the client identifier. In other embodiments, the session identifier is associated with the client such that the session key 216 only includes the session identifier and the client identifier is omitted.

The assignment module 210 may also be programmed to inform the assignee support provider of the assignment by transmitting assignment data thereto or otherwise making the assignment data available to the assignee support provider. For example, the assignment data may include the session identifier and client identifier of the session key 216. Where the assignee support provider is a group of individuals, the assignment data may be transmitted to a designated leader of the group or a specific member of the group selected randomly or in accordance with some specified order. Alternatively, or additionally, the assignment data may be transmitted to every member of the group or stored in a location accessible by each member of the group.

The session assignment module 210 may be further programmed to assign a session to a different support provider or group of support provider. The session assignment module 210 may reassign a session by changing the support provider or group of support providers identified by the support provider identifier of the session key 216. The session assignment module 210 may execute a request for reassignment in response to a request from the support provider currently identified by the session key 216 and may first authenticate the source of the request for reassignment to be the support provider identified in the session key 216. The request for reassignment may include an identifier for another support provider or group of support providers and the assignment module 210 may reassign the session by changing the support provider identifier of the session key 216 to refer to the support provider or group of support providers included in the request for reassignment. The assignment module 210 may also transmit assignment data to the new assignee as described hereinabove with respect to the initial assignment of a session.

Alternatively, or in addition, the session assignment module 210 may receive a request for reassignment from a supervisor or someone with administrative privileges. The session assignment module 210 may likewise authenticate the source of the request for reassignment and verify the authorization of the source to perform the reassignment prior to executing the reassignment as described above.

The session termination module 212 detects ending of the session and prevents further access of the session record 214 or the client database 204 by means of the session key 216 by the assignee support provider. In one embodiment, the session termination module 212 may prevent further access of the session record 214 by "clearing" the session key 216. Clearing may include changing the support provider identifier stored in the session key 216. For example, the support provider identifier of the session key 216 may be changed to a null value, set to a value of a supervisor or administrator, or changed to some other value.

After a session is terminated, access to the client database 204 and session record 214 may be limited to access by those having supervisory access privileges. In some embodiments, portions of the client database 204 and session record 214 may be public following termination to enable statistical study of all session records 214 or to provide an index or overview of what is stored in the session record 214 or client database 204.

The session termination module 212 may detect ending of the session by receiving an input from the client, such as an input transmitted from the client computer 102 to the server 106, indicating that the session is ended. Alternatively, upon resolving the client's request, the assignee support provider identified in the session key 216 may provide an input, such as by transmitting an input from the support computer 114 to the session termination module 212, indicating that the session is to be ended. Alternatively, a supervisor or someone charged with monitoring closing of sessions may provide an input to the session termination module 212 indicating that the session is to be ended. In some embodiments, the session termination module 212 detects closing of the session by detecting closing of a phone connection to a telephone of the client.

The client database 204 may include an authentication module 218. The authentication module 218 may receive requests to access the client data 206 and session records 216. The authentication module 218 may be hosted by the same server 106 hosting the client database 204 or may be hosted by a separate server 106. For example, an authentication server 106 may receive requests for access and transmit authorized requests to a database server 106 hosting the client database 204 for execution.

Requests transmitted to the authentication module 218, such as requests transmitted from support computers 114, may include an assignee key 220 from a support provider seeking access. The assignee key 220 may include a client identifier, session identifier, and support provider identifier. In embodiments where the session key 216 omits the client identifier, the assignee key 220 may likewise omit the client identifier. The authentication module 218 compares the assignee key 220 and the session key 216. If each field of the session key 216 corresponds to each field of the assignee key 220, the authentication module 218 may execute or authorize execution of the request. In some embodiments, the authentication module 218 verifies that each field of the session key 216 is identical to each field of the assignee key 220. Alternatively, the authentication module 218 may verify that the support provider corresponding to the support provider identifier of the assignee key 220 belongs to a group identified in the session key 216. The authentication module 218 may also verify that the client identifier of the assignee key 220 corresponds to a group of client identifiers specified in the session key 216.

The authentication module 218 may also verify that a source of a request for access is indeed the support provider identified in the support provider identifier field of the assignee key 220 accompanying a request for access. For example, the request may be accompanied by a password that the authentication module 218 verifies to be identical to a password for the support provider identified in the assignee key 220. Alternatively, the support provider may provide a password at the time of login to the support computer 114 and the authentication module 218 may verify a request by determining whether the request was transmitted from the support computer 114 and that the support provider identified in the assignee key 220 was in fact logged in to the support computer 114 at the time the request was transmitted.

Figure 3:
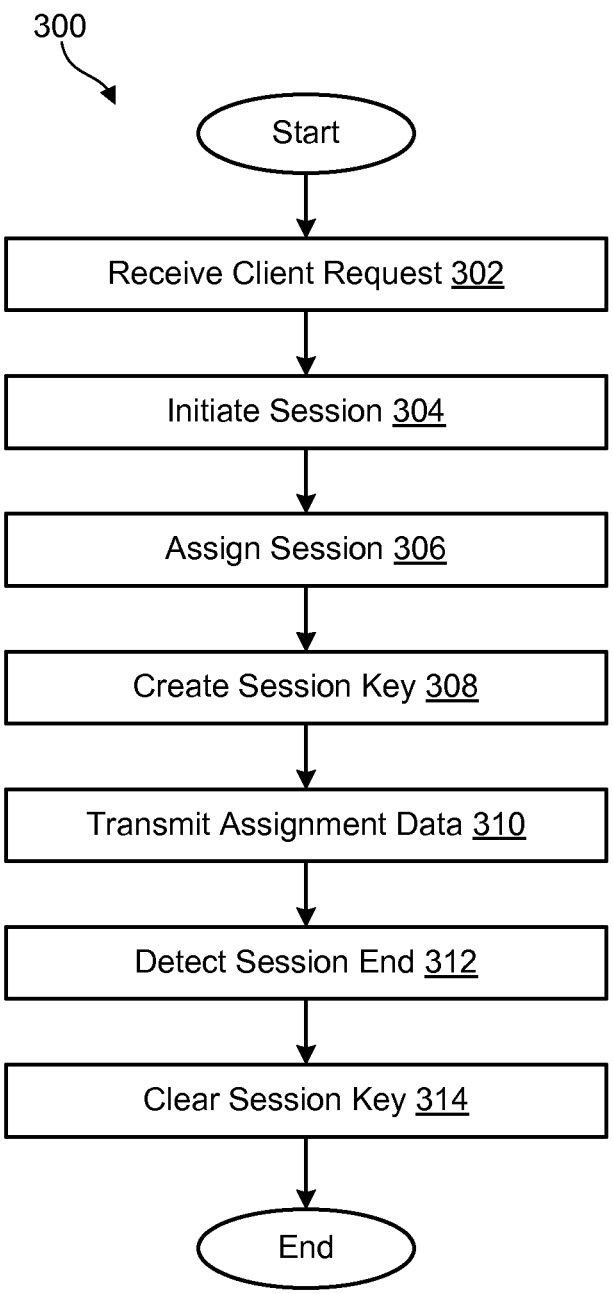
FIG. 3 is a process flow diagram of one embodiment of a method for controlling access to client data by support personnel.

Referring to FIG. 3, a server 106, such as the server illustrated in FIG. 2, may execute a method 300 for controlling access of client data 206 by personnel providing technical support or other assistance. At step 302 a request for assistance is received from a client, such as by receiving a message transmitted from a client computer 102. The request may identify the client and include authentication information used to verify that the source of the request is the client identified in the request. The request may also be received in person or over the phone and then input to a computer system, such as the server 106, by means of a support provider. In some embodiments, receipt of a phone call from a client phone may be deemed a request for assistance. Authentication of the client in such instances may include an operator requesting authentication information from the client in order to verify the client's identity and/or verify that the phone call is being made from the client phone.

At step 304 a session is initiated to provide a record of the client's request for assistance and to coordinate access to client data. Initiation of the session may include generating a session record 214 and a session identifier uniquely identifying the session.

At step 306, the session is assigned. Assignment may include determining which support provider or group of support providers is to handle the request. Assignment may include evaluating records for the client making the request to determine an association between the client and a support provider or group of support providers. For example, if the records indicate that the client purchased a specific product or service, the client's request for assistance may be assigned to a support provider or group of support providers that are responsible for assisting clients with the purchased product or service. Alternatively, the request for assistance may identify the product or service for which assistance is needed or specifically identify a support provider or group of support providers from whom assistance is requested or have provided assistance in the past.

At step 308 a session key 216 is created. The session key 216 may include a client identifier, session identifier, and support provider identifier. The client identifier is an identifier associated with the client whose request for assistance prompted initiation of the session. The session identifier may be the identifier generated upon initiation of the session to uniquely identify the session. The support provider identifier of the session key 216 may include an identifier for the support provider or group of support providers identified at the assignment step 306. In some embodiments, the session identifier may be associated with the client such that the client identifier may be omitted from the session key.

At step 310 assignment data is transmitted to the support provider or group of support providers identified in the assignment step 306. For example, step 310 may include transmitting the client identifier and session identifier for the session to the support provider or one or more of a group of support providers identified by the assignee support provider identifier of the session key 216. Where a group of support providers is selected at the assignment step, the assignment data may be transmitted at step 310 to a supervisor or group leader rather than each individual member of the group. In some embodiments, transmitting the assignment data at step 310 may include placing the assignment data in a location accessible by the support provider or group of support providers identified at the assignment step 306.

At step 312, ending of the session is detected. Detecting ending of a session at step 312 may include receiving an input from the client whose request initiated the session. For example, an input indicating the session is ended may be received at step 312 from the client computer. Alternatively, upon resolving the client's request, the assignee support provider identified in the session key 216 may provide an input, such as by transmitting an input from the support computer 114 to the session termination module 212, indicating that the session is to be ended. Alternatively, a supervisor or someone charged with monitoring closing of sessions may provide an input at step 312 indicating that the session is to be ended. In some embodiments, step 312 includes detecting closing of the session by detecting closing of a phone connection to a telephone of the client. Step 312 may include detecting closing of the phone call received at step 302.

At step 314, the session key 216 is cleared to prevent further access to client data 206 or data generated during the session using the session identifier for the session. Clearing the session key 216 may include making a note in a database that the session is closed and/or that the session identifier of the session key 216 for the session is no longer valid. This may include nullifying the session identifier of the session key. Where the session is indicated to be closed either in the session key 216, or in some other data set indicating the status of sessions, requests for access that include an assignee key 220 referring to the ended session may be denied based on the recorded status of the session.

Alternatively, clearing the session key 216 at step 314 may include setting the support provider identifier of the session key 216 to refer to a supervisor or administrator rather than the original assignee support provider. Clearing the session key 216 may also include setting the support provider identifier thereof to a null value. A subsequent request to access data of the client that includes an assignee key 220 referring to the ended session will therefore be denied since no support provider identifier will correspond to that of the session key.

Figure 4:
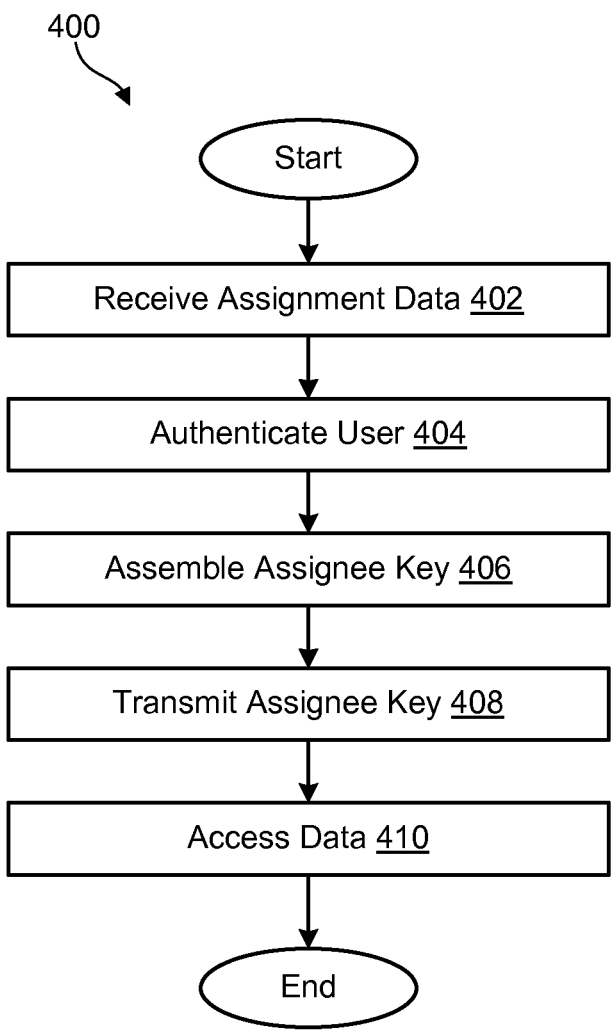
FIG. 4 is a process flow diagram of one embodiment of a method for generating a request to access client data.

Referring to FIG. 4, in certain embodiments, a support computer 114 may execute the illustrated method 400 when interacting with a host 106 such as that illustrated in FIG. 2 or a host 106 executing a method 300 as in FIG. 3. At step 402, the support computer 114 receives assignment data. The assignment data may include one or both of a session identifier and a client identifier. Upon receiving the assignment data, the support provider operating the support computer 114 may elect to commence addressing the client request that initiated the session identified by the session identifier. The support provider may do so by first authenticating the support provider at step 404. This may include the support provider logging on to the support computer 114 by providing a user name and password. Alternatively, the support provider may provide a password and/or username to the server 106, which subsequently authenticates the support provider.

At step 406, an assignee key 220 is assembled. Step 406 may include manual assembly by the support provider operating the support computer 114. Alternatively, step 406 may include automated assembly of the assignee key 220 based on a support provider identifier of the support provider and one or both of the client identifier and session identifier provided in the assignment data. At step 408, the assignee key 220 is transmitted from the support computer 114 to the server 106. At step 410, the support provider is enabled to access the client data if the assignee key 220 corresponds to the session key 216 of the session identified by the assignee key 220. In some embodiments, steps 404-410 may be performed each time a support provider attempts to access the client data 206. Alternatively, only 406-410 are performed for each access attempt. In yet another embodiment, steps 404-410 are performed each time a support provider logs into the support computer 114. In some embodiment, steps 404-410 are performed once upon a first attempt to access client data 206 using an assignee key 220 and data access is permitted so long as the assignee key 220 is valid, e.g. the session key 216 has not been cleared such as described above with respect to step 314 of the method 300.

Figure 5:
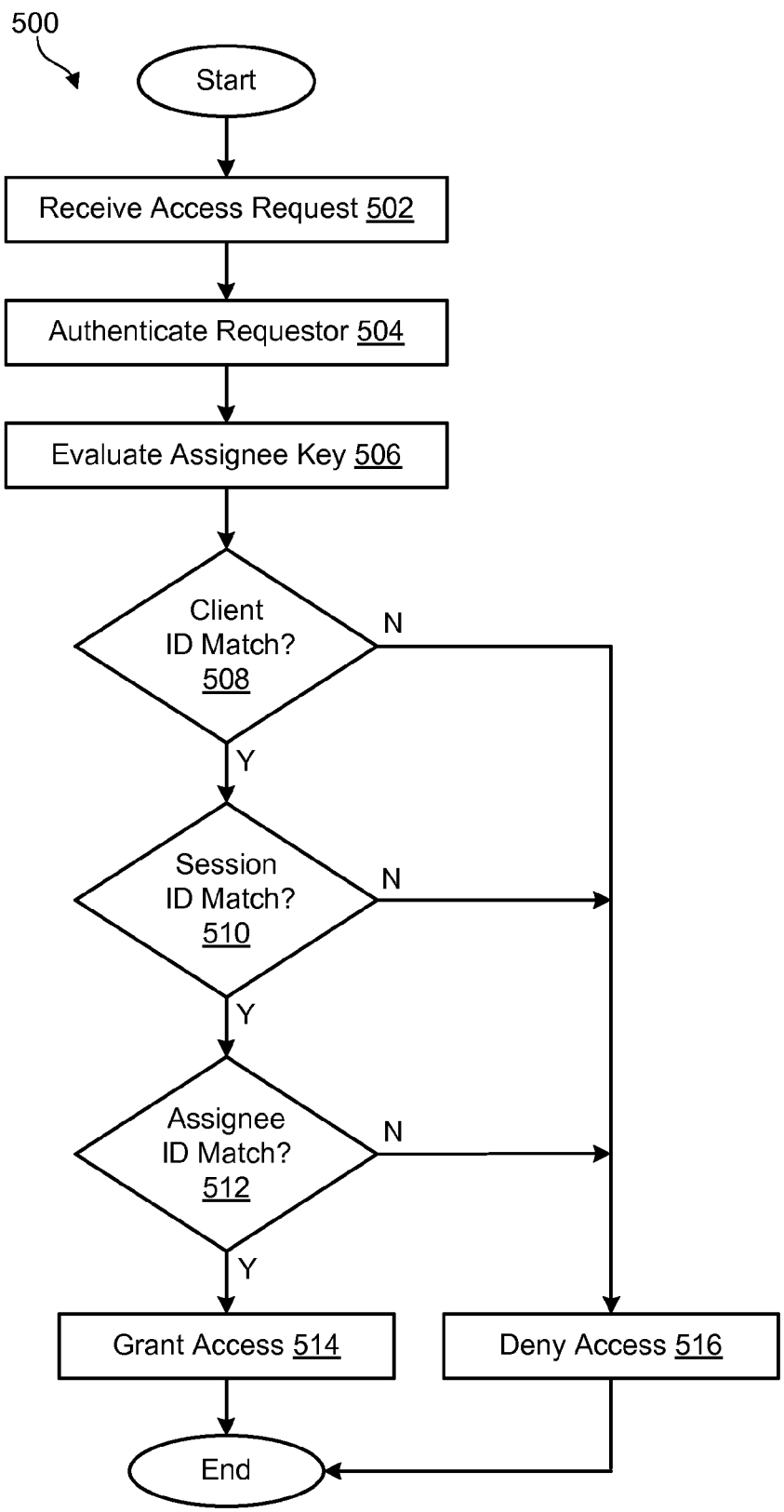
FIG. 5 is a process flow diagram of one embodiment of a method for processing a request to access client data.

Referring to FIG. 5, upon receiving a request to access the client data 206 a server 106 hosting the client database 204 or providing authentication services for the client database 204 may perform the illustrated method 500. The method 500 may be executed by the authentication module 218 of the client database 204. At step 502 a request to access the client data 206 is received. At step 504 the requestor that generated the request is authenticated. This may include evaluating authentication data provided with a request to access the data or verifying whether the support provider claiming to be the source of the request is logged in with the proper user name and password to a support computer 114. At step 506, an assignee key 220 provided with the request is evaluated. The assignee key 220 may include a client identifier indicating the owner of the client data 206 that the requestor seeks to access. The assignee key 220 may further include an identifier of the session within which the requestor seeks to access the client data 206 and a support provider identifier of the requestor, or of a group to which the requestor belongs.

At steps 508-512, the client identifier, session identifier, and support provider identifier of the session key 216 and the assignee key 220 provided with the request are compared, respectively. In embodiments where the session key 216 and assignee key 220 do not include a client identifier, step 508 may be omitted. If matching is found at steps 508-512, access is granted at step 514. If not, then access is denied at step 516. In cases where the support provider identifier of the session key 216 is a group identifier, step 512 may include evaluating whether the support provider that generated the request belongs to the group identified in the session key 216. This may include comparing the support provider identifier in the assignee key 220 to an access list associated with the group identified in the session key 216.

Figure 6:
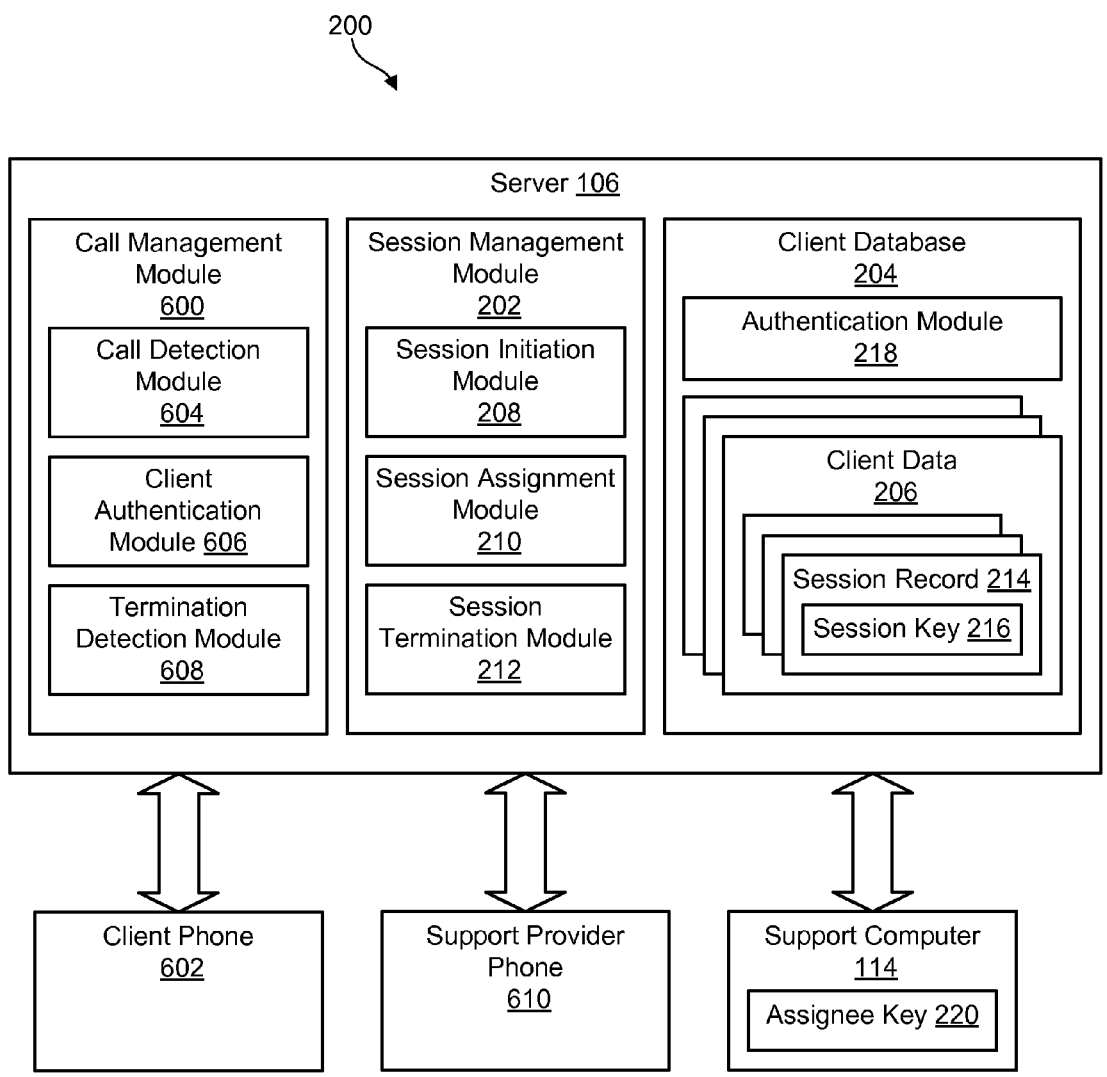
FIG. 6 is a high-level block diagram of an alternative embodiment of a system for controlling access to client data by support personnel.

Referring to FIG. 6, in an alternate embodiment of a system 200, a server 106 may host a call management module 600 in addition to the session management module 202 and client database 204 described above. The call management module 600 may support a specific implementation of the apparatus and methods described hereinabove wherein access to client data 206 is permitted according to whether the client is connected by telephone to a support provider or other employee of the company managing the server 106. In certain embodiments, support providers that are not supervisors or administrators having special access privilege are granted access to client data 206 only while an open phone connection to a client phone 602 exists.

The call management module 600 may include a call detection module 604, client authentication module 606, and termination detection module 608. The call detection module 604 detects phone calls from a client phone 602. For purposes of this disclosure, client phone 602 refers to a phone operated by a client and a requirement that the phone be associated with the user as a result of ownership or consistent use is not implied. The call detection module 604 may detect all calls to a specific phone number or call center. The call detection module 604 may invoke the client authentication module 606 upon detecting a call. The client authentication module 606 may verify that the person speaking on the client phone 602 is in fact an owner of client data 206 within the client database 204 or is otherwise who the person making the call claims to be. Where the person making the phone call is a new client who does not currently own data 206 in the client database 204, the client authentication module 606 may assist the person in setting up authentication information such as a username, password, other identity verification data, or a phone number the person will be calling from when seeking to access data or request assistance.

The authentication module 606 may be embodied as an interface used by an employee of the organization managing the host system 106 executing the call management module. The employee may verbally communicate with the client speaking over the client phone 602 to verify the client's identity or input authentication information for new clients. In an alternative embodiment, voice recognition technology and prerecorded messages may be used to request and input authentication information.

Upon authentication of the client speaking over the client phone 602 or receiving authentication information from new clients, the authentication module 606 may invoke the session initiation module 208 of the session management module 202 to initiate a session as described hereinabove. Access to client data and authentication of support providers seeking to access client data 106 may then proceed as described hereinabove.

In the illustrated embodiment, the session assignment module 210 may transfer the phone connection with the client phone 602 to a support provider phone 610 operated by a support provider. The assignment module 210 may also transfer the phone connection to the support provider phone 610 of another support provider when the session is reassigned according to the methods described hereinabove.

The termination detection module 608 may detect closing of a phone connection to the client phone 602. Upon closing of the phone connection, the termination detection module 608 may match the phone connection to a session identifier and invoke the session termination module 212 to close the session according to the functionality of the session termination module 212 described hereinabove.

Figure 7:
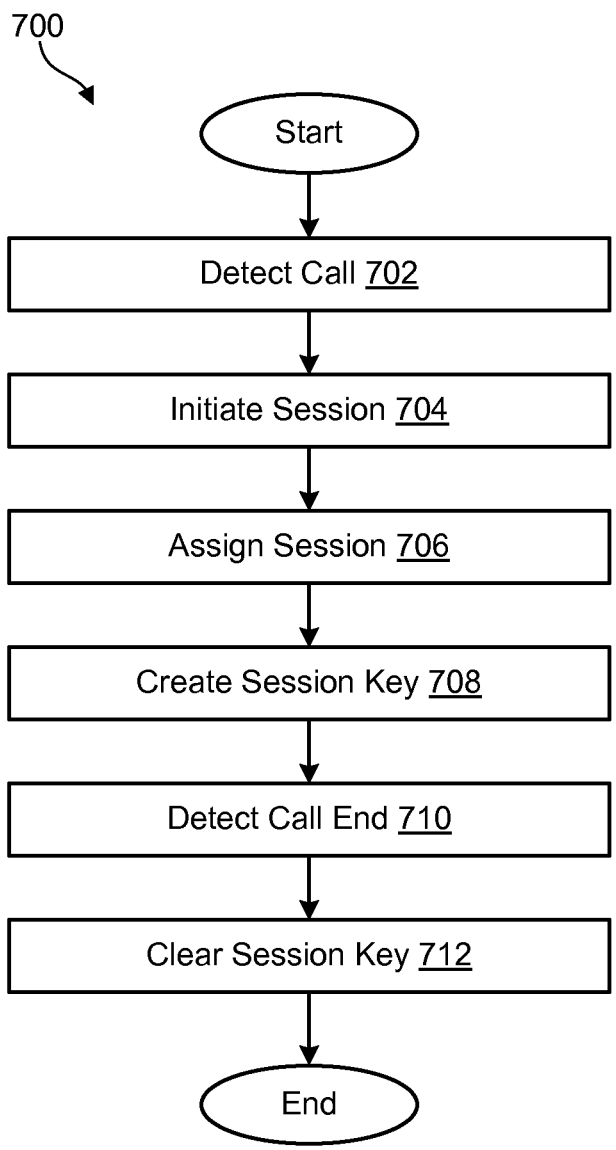
FIG. 7 is a process flow diagram of an alternative embodiment of a method for controlling access to client data by support personnel.

Referring to FIG. 7, a method 700 for controlling access to client data by a support provider may be performed using the system 200 of FIG. 6 or another suitable system. The method 700 includes detecting a phone call at step 702. A session is initiated to track and record the handling of the phone call at step 704. Step 704 may include authenticating the person making the phone call. At step 706, the session is assigned to a support provider. Assignment may include transferring the phone connection detected at step 702 to the phone 610 of the assignee support provider. At step 708, a session key 216 is created. The session key 216 may include a client identifier, session identifier, and support provider identifier of the assignee support provider. In some embodiments the client identifier may be omitted from the session key 216 and the session identifier may be mapped to data of a specific client using a look up table or by decoding information included in the session identifier.

Following creation of the session key 216, the assignee support provider may access the client data 206 using an assignee key 220 that includes a client identifier, session identifier, and support provider identifier corresponding to the session key 216 according to the methods and apparatus described hereinabove. In embodiments that omit the client identifier from the assignee key 220 and session key 216, only correspondence between the session identifier and support provider identifier of the assignee key 220 and session key 216 may be required to access the client data 206.

At step 710 closing of the phone connection to the client phone 602 is detected. Alternatively, detecting closing of the phone connection may include detecting closing of a phone connection to the support provider phone 610. Upon detecting ending of the phone connection, the session key 216 created for the phone connection at step 708 is cleared at step 712 according to methods described hereinabove.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for controlling access to client data by support personnel, the method comprising:
    initiating a communication session between a client and support provider in response to receipt of a request for assistance from the client, the communication session having client data associated therewith;
    generating a session key for the communication session, the session key comprising a session identifier and a support provider identifier corresponding to an assignee;
    receiving a request at a server to access the client data, the request including an assignee key including a session identifier and a support provider identifier;
    executing the request to access the client data if the session identifier and support provider identifier of the session key correspond to the session identifier and support provider identifier of the assignee key; and
    detecting ending of the communication session between the client and the support provider and, in response, changing the support provider identifier of the session key.

2. The method of claim 1, wherein changing the support provider identifier of the session key comprises changing the support provider identifier to that of an individual with administrative privileges.

3. The method of claim 1, wherein changing the support provider identifier comprises changing the support provider identifier to a null identifier.

4. The method of claim 1, wherein the request for assistance from the client is received from a client phone and detecting termination of the communication session comprises detecting closing of a phone connection to the client phone.

5. The method of claim 1, further comprising authenticating a source of the request for assistance to be the client.

6. The method of claim 1, wherein the session key and the assignee key include a client identifier, and executing the request comprises executing the request if the client identifier of the assignee key corresponds to the client identifier of the session key.

7. The method of claim 1, wherein initiating the communication session further comprises transmitting the session identifier to a support computer associated with the assignee.

8. The method of claim 1, wherein executing the request comprises executing the request only upon verifying a source of the request to be the assignee.

* * * * *